United States Patent [19]
Menzenski

[11] Patent Number: 5,934,193
[45] Date of Patent: Aug. 10, 1999

[54] MICR INDICIA DIAGNOSTICS

[75] Inventor: Gregory Menzenski, Ithaca, N.Y.

[73] Assignee: Axiohm Transaction Solutions, Inc., Blue Bell, Pa.

[21] Appl. No.: 09/153,995

[22] Filed: Sep. 17, 1998

[51] Int. Cl.[6] ....................................... B41F 1/00
[52] U.S. Cl. ............................................ 101/287; 400/61
[58] Field of Search ............................... 235/379; 400/61, 400/78, 105, 70; 101/93.18, 90, 287; 178/4.1 A

[56] References Cited

U.S. PATENT DOCUMENTS

| | | | |
|---|---|---|---|
| 4,541,334 | 9/1985 | Liedtke et al. | 101/93.18 |
| 5,053,607 | 10/1991 | Carlson et al. | 235/379 |
| 5,226,361 | 7/1993 | Grant et al. | 101/44 |

*Primary Examiner*—John Hilten
*Assistant Examiner*—Charles H. Nolan, Jr.
*Attorney, Agent, or Firm*—Salzman & Levy

[57] ABSTRACT

A transaction printer includes the MICR encoding of indicia. A diagnostic test procedure reads a printed test document and determines whether the MICR indicia are within a certain specification. A test document found to be out of specification prompts the adjustment of the print parameters of the printing system of the transaction printer. The machine establishes and maintains a data base of each print transaction, and compares the printing parameters to determine the degree to which each parameter complies with the specification.

7 Claims, 6 Drawing Sheets

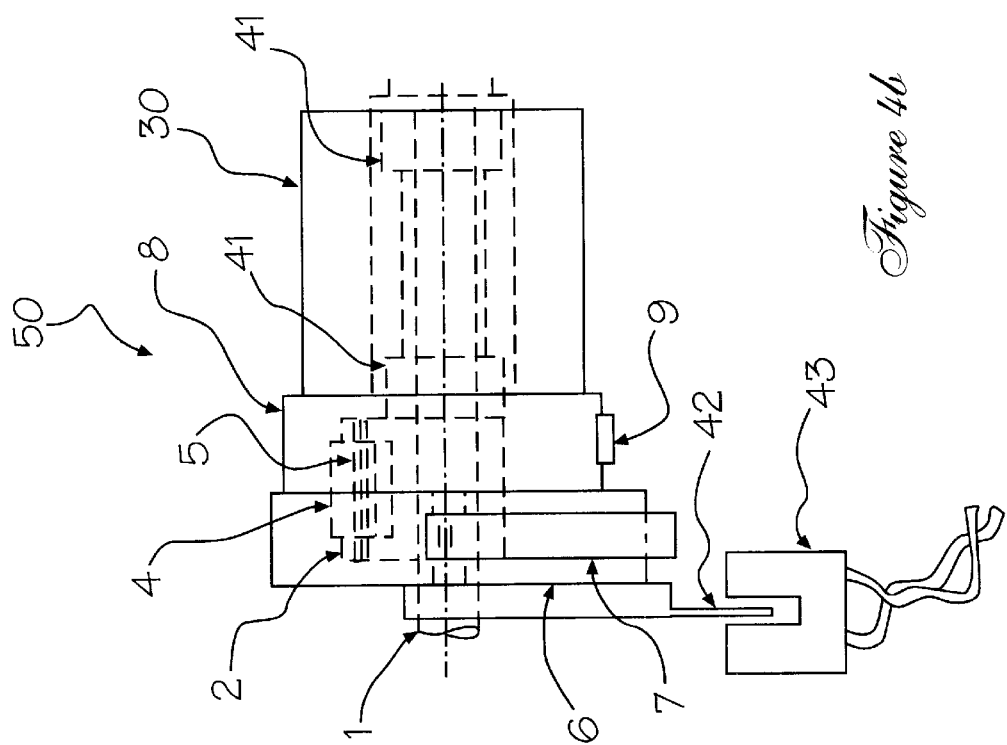
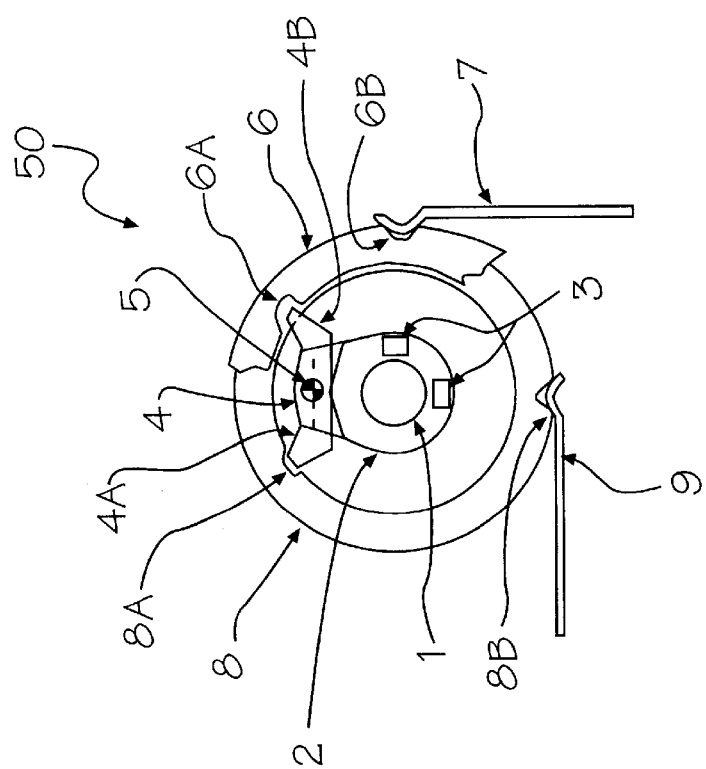

MICR INDICIA DIAGNOSTICS

FIELD OF THE INVENTION

The present invention relates to a point-of-sale (POS) transaction printer and, more particularly, to a point-of-sale transaction printer having a thermal printer for imprinting a check with MICR characters and a MICR read head for reading and verifying the MICR indicia. A diagnostic program allows the machine to adjust its printing parameters to ensure that the MICR characters encoded on the check meet standards and will be readable by check processing equipment at the merchant's bank. The system automatically collects performance data as it verifies, and actuates the diagnostic program when it determines that tuning of the system is required.

BACKGROUND OF THE INVENTION

In present day point-of-sale (POS) operations, the MICR indicia that are to appear on the check of a customer are added after the sale, and at a remote location (i.e., either at the bank, or in a separate, back room at the retail site).

For the first time, this invention seeks to eliminate the post-operative role of supplying the required MICR indicia on a check presented for POS payment at a retail establishment. Owing to its new function, machines now being designed by the present assignee of this invention must be able to encode and read MICR located in a specific field (i.e., the amount field) of the check, at the point-of-sale. Because of the precision required for MICR encoding, it is necessary to keep the encoding mechanism fine-tuned and immediately cease encoding checks if the mechanism degrades to the point that satisfactory characters cannot be encoded.

In a MICR encoder of the new machine, the MICR characters must be printed at a precise distance to the right edge of the check in order to place the MICR characters in the proper field site. In order to accomplish this, an optical sensor is provided to detect the edge of the check and stage it at a known location from the thermal, MICR print head. It then becomes a simple matter to advance the check by a stepper, drive and print motor a fixed number of step increments in order to start the printing sequence.

In addition, it is essential that the encoded MICR characters be verified after printing to assure their accuracy. The MICR indicia imprinted upon each check extend to each edge on the left and right of the check to within 0.31 inches. It becomes necessary, therefore, to provide an additional read head.

The performance of our MICR encoder can be influenced by the substrate (paper) characteristics. This diagnostic function can be used to match the printing parameters and performance to the particular substrate used at each customer location.

Performance of conventional MICR readers is determined by reading test documents printed to the extreme limits of the various check specifications. These performance tests have the limitation that the information obtained therefrom is a "go/no-go" assessment. Additionally, check print equipment is designed to print checks in specification. These check test documents are difficult for check printers to produce because they are typically printed to the very limits of specification. As a result, many of these test checks are in fact out of specification, causing many problems when they are used to assess as part of hardware performance assessment via diagnostics. Therefore, the present invention reflects the development of a diagnostic program that adjusts the print parameters of the MICR print head to tune the encoder so that the printed characters are always within specifications, and at their best possible level of performance. In addition, if the encoding cannot be accomplished satisfactorily, the encoder may be disabled, thus preventing defective MICR characters on checks which may lead to reading problems during subsequent check processing.

The diagnostic system of the invention provides an intelligent, closed loop system that adjusts and fine tunes the print system. In so doing, the diagnostic system may eliminate service calls by field service personnel. It also provides quick verification of system performance.

The MICR encoder/printer environment is unique because both the information to be encoded on the check and the results of the encoding operation are known. Consequently, based on a comparison of the two, inference may be drawn regarding the performance of the encoder, specifically with regard to developing out-of-spec printing trends. Because the magnetic "signature" of an E13B MICR character relative to its visual appearance is not readily apparent to an untrained observer, minor visual changes in an encoded character may result in that character being misread. When a character reading problem results in a reject (i.e., the character can not be recognized by the verifying circuity), the problem is minimal. Because the magnetic signatures of, for example, characters 2 and 5 are similar, certain printing abnormalities may result in the reading of a 2 for a 5 or vice versa. This is true of characters 1 and 7 as well. There are other less obvious "substitution" patterns know to those skilled in the art. The "proper" reading of an incorrect character leads to for more dire consequences than the simple rejection of a poorly printer character.

The MICR encoder/transaction printer of the present invention is provided with a unique system for capturing the verification results for all printed characters and symbols in a performance database. In the database, developing trends in the encoding characteristics (e.g., the drift of a 5 towards a 2, etc.) may be identified. Certain printing parameters may be corrected based on the results obtained by analysis of the performance database. If correction of the encoder is not possible, the host controller and/or printer operator may be signaled and informed about the problem. Manual diagnostics may the be performed and/or a hardware problem repaired by service personnel.

SUMMARY OF THE INVENTION

In accordance with the present invention, there is provided a transaction printer with means for encoding and subsequently reading MICR indicia upon a check presented for payment at a point-of-sale. The machine comprises a presenting zone, at which the check is presented to the machine with a specific facial orientation. The check is fed into the machine by a pair of drive rollers. The check passes an encoding MICR print head in a printing zone. A reflective optical sensor, disposed at the presenting zone, stages the check for various positions with respect to MICR printing. As the check is fed backwardly towards the presenting zone, the lead edge of the check is sensed by the optical sensor. The sensor generates a signal in response to sensing the lead edge. This signal is sent to the drive rollers, commanding them to stop feeding the check. The check is now positioned for printing (encoding) the MICR characters in the amount field of the check. After the MICR indicia has been encoded by a thermal transfer printer, the drive rollers clamp and grip the check, and the check is driven past a secondary read head of the check processing machine. The edge of the check is again sensed by the optical sensor, which sends a signal to stop the drive rollers. The MICR indicia in the amount field are then read by the secondary read head. During the verification of the amount field at the secondary read head, the signal generated at the read head may be compared to known parameters. The operation of the MICR encoder may then be adjusted to ensure MICR encoding meeting the necessary specifications. After reading and verifying the MICR characters in the amount field of the check, the other MICR indicia can be read by a primary read head. Afterward, the check is driven out of the check processing machine, and presented to the operator. The drive rollers are then opened to allow the operator to remove the check.

The check encoder comprises a diagnostic program that adjusts the print parameters of the MICR print head to tune the print system so that the printed characters are always within specifications. A diagnostic print mode may be selected from a control panel of the machine. In the diagnostic print mode, the MICR encoder prints a series of standard and, optionally, unique characters. These characters are then read by a verifying (second) read head to determine whether the printing system is within specification. The characters include standard CMC7 and/or E13B characters and symbols, and unique indicia that includes vertical bars, known in the art as "zebras." Thereafter, the machine reads these characters, symbols, and indicia, and generates information that is used to adjust the print parameters to their best possible level of performance.

The system automatically collects performance data as it verifies, and actuates the diagnostic program when it determines that tuning of the system is required. The data is stored in a data base of non-volatile memory either within the printer or, optionally, in the memory of the controller to which the printer is connected. A third possibility is to store performance data in the memory of a central computer system. The data base provides a record about the "state of health" of the check processing machine.

Stored performance data may be analyzed to identify emerging encoding trends (e.g., the trend towards printing a 5 which will be recognized as a 2). If the encoding parameters can be corrected, this may be done automatically by the circuitry within the MICR encoder/transaction printer. Otherwise, either the operator or the host may be signaled and diagnostics performed and/or the hardware serviced.

It is an object of this invention to provide a transaction printer for encoding and verifying MICR indicia on a check at a point-of-sale.

It is a further object of this invention to provide a transaction printer with a MICR encoder that can verify MICR indicia.

It is yet another object of the invention to provide a transaction printer that has a closed loop diagnostic system for self-tuning the MICR printing upon the check.

It is yet a further object of the invention to provide a check processing machine that keeps a record of performance data and which may automatically invoke a diagnostics mode in response to predetermined performance data.

It is still another object of the invention to analyze stored performance data and determine emerging out-of-spec encoding trends.

It is a still further object of the invention to automatically adjust the encoder in response to an analysis of stored performance data.

BRIEF DESCRIPTION OF THE DRAWINGS

A complete understanding of the present invention may be obtained by reference to the accompanying drawings, when considered in conjunction with the subsequent detailed description, in which:

FIGS. 4a and 4b illustrate respective, front cut-away and side views of a bi-directional clutch for driving the platen and print head arm lift cam, shown in FIGS. 1 through 3;

DESCRIPTION OF THE PREFERRED EMBODIMENT

Generally speaking, the invention features a transaction printer that encodes and reads MICR indicia at a point-of-sale. A sensor is provided in a the MICR encoding machine to detect the edge of the check and allow precise registration of the check for subsequent printing of the MICR characters. The sensor also provides check location information to the control electronics for reading and verifying the encoded indicia. A diagnostic mode may be selected from a control panel of the check processing machine, that adjusts and fine tunes the MICR print system.

Figure 1:
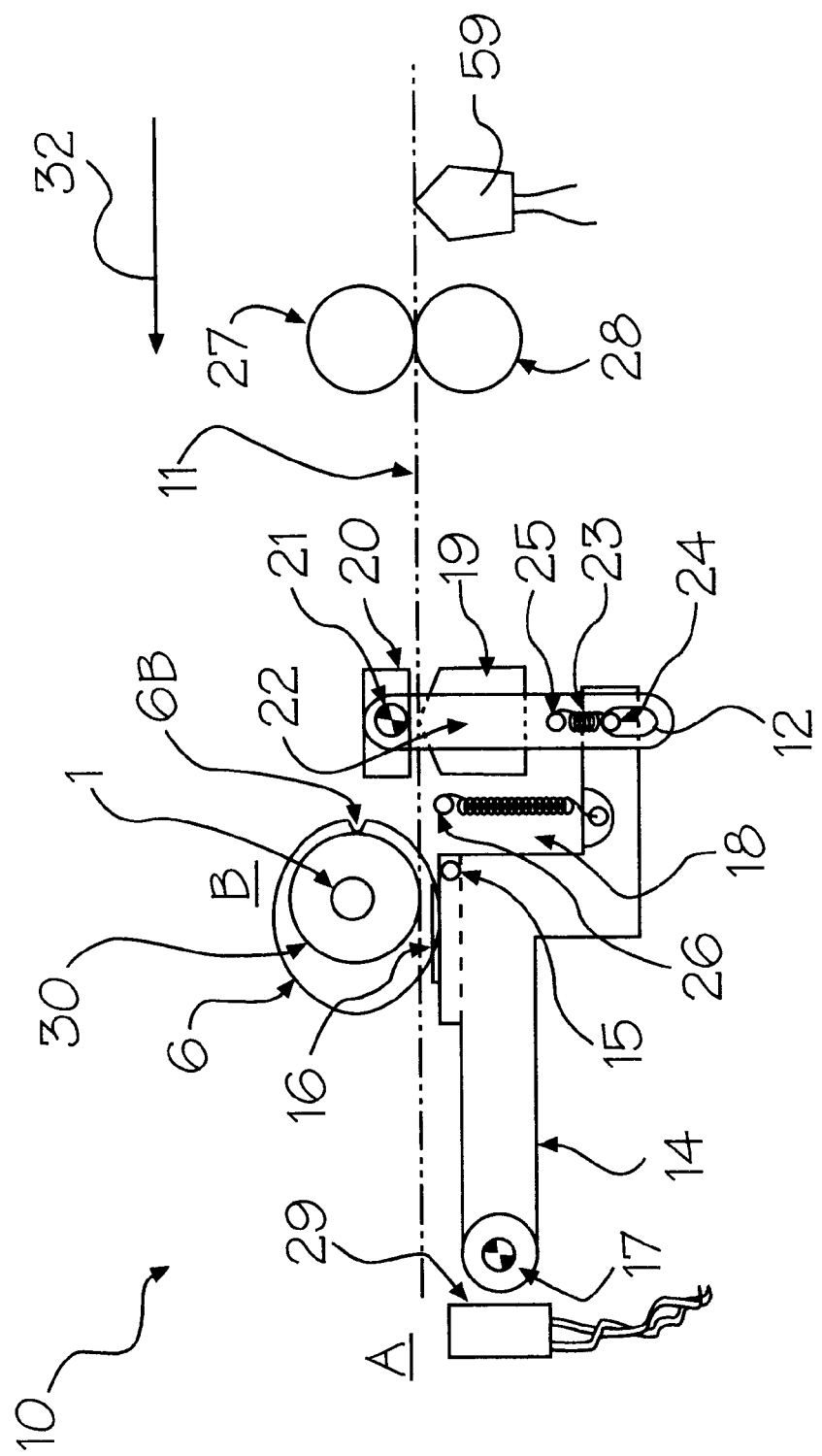
FIG. 1 illustrates a schematic view of a check processing apparatus in a first check handling position corresponding to the insertion of a check.

Referring to FIG. 1, a check processing apparatus 10 is shown. A check (not shown) is inserted into the check processing apparatus 10 at point A with a face down orientation. The check is fed into the apparatus 10 along the check feed path 11. The apparatus 10 is designed to encode the check with MICR indicia at the point-of-sale. To provide the MICR characters, a MICR encoder print head 16 is disposed along feed path 11. A MICR secondary read head 19 and a primary read head 59 are disposed along feed path 11. The secondary read head 19 is used to verify the MICR characters imprinted in the amount field of the check. The primary read head 59 is used to read all the other MICR indicia in the assigned fields of the check. The engagement of the primary read head 59 is controlled by a bi-directional clutch 50 in similar fashion as that of the secondary read head 19, as explained hereinafter.

A pressure pad 20 is located above the MICR read head 19. This pressure pad presses the check, or other printed media, against the read head 19 to ensure good contact. A link 22 is connected to the pressure pad 20 through a pivot pin 21. A slot 12 at the distal end of the link 22 causes the link to be guided by link pin 24, which is fixedly attached to the end of the print head arm 14. The print head arm 14 is biased upwardly (arrow 33, FIG. 2) via spring 18 that is anchored to the housing pin 26. The pin 24, which rides in slot 12, is biased against the upper end of slot 12 by a tension spring 23 that is attached at its other end to pin 25. The spring 23 provides the contact force for pressure pad 20, as pin 24 moves away from pin 25 guided by the slot in link 22. The check, or other media, is driven by feed rollers 27 and 28, which are part of the point-of-sale printer, which is positioned to the rear of the check processing apparatus 10, and is not shown here for brevity.

A reflective optical sensor 29 disposed at point A, stages the check for the various positions of the MICR print mechanism. In the home position 1, shown in FIG. 1, the cam 6 holds the print head 16 away from the platen 30 by bearing against pin 15. Pressure pad 20 is also held away from the MICR read head 19 in the home position, as previously mentioned. Therefore, a check or other media can now be inserted into the print zone B of the check processing apparatus 10. Feed rollers 27 and 28, which are normally separated, are now clamped together to grip the inserted check and feed it into the main printer unit for validation of account information on the check. The feed rollers 27 and 28 are rotated by a stepper motor (not shown). The check is driven back out (arrow 32) when validation is complete. The feed rollers 27 and 28 stop feeding the check when the lead edge of the check is detected by the reflective optical sensor 29 at point A. The check is now positioned for printing (encoding) of the MICR characters in the amount field of the check.

Figure 2:
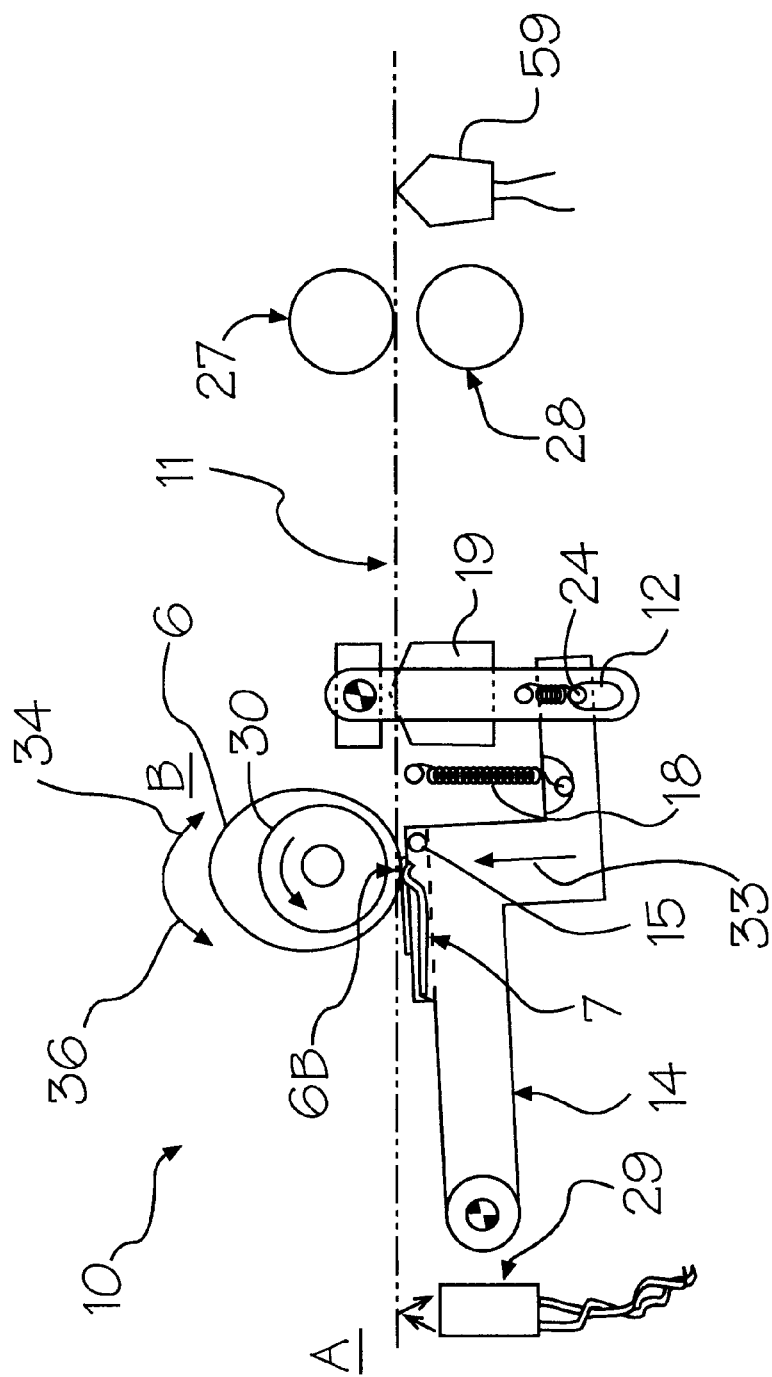
FIG. 2 depicts a schematic view of a check processing apparatus in a second check handling position corresponding to the MICR encoding of indicia thereupon.

Referring to FIG. 2, the second position of the check processing apparatus 10 is illustrated. In this position, also known as the MICR encode position, cam 6 rotates clockwise (arrow 34), so that there is now clearance between the cam 6 and pin 15. This allows the print head 16 to press a print ribbon (not shown) and the check against platen 30. A detent spring 7 engages in a suitable notch 6B in the cam, to hold the cam position. The cam 6 and platen 30 are both rotatively fixed upon the power input shaft 1. The cam 6 and platen 30 are selectively driven by the shaft 1, when the shaft 1 rotates either clockwise (arrow 34) to drive cam 6, or counter-clockwise (arrow 36, FIG. 2) to drive the platen 30. This is accomplished by a bi-directional clutch mechanism 50 disposed within the cam 6, as explained hereinafter with reference to FIGS. 4a, 4b, and 5. The shaft 1 is driven in the counter-clockwise direction 36, in order to drive the platen 30 in the same direction.

The edge of the check is detected by the reflective optical sensor 29 at point A. This commands the control electronics of the check processing apparatus 10 to start energizing the heater elements on the print head 16, which melts and transfers a wax-based ink from the ribbon to the check, thereby forming the MICR characters. It should be noted that feed rollers 27 and 28 are disengaged (opened) before platen 30 starts rotating. Pressure pad 20 and MICR read head 19 are also held apart.

Figure 3:
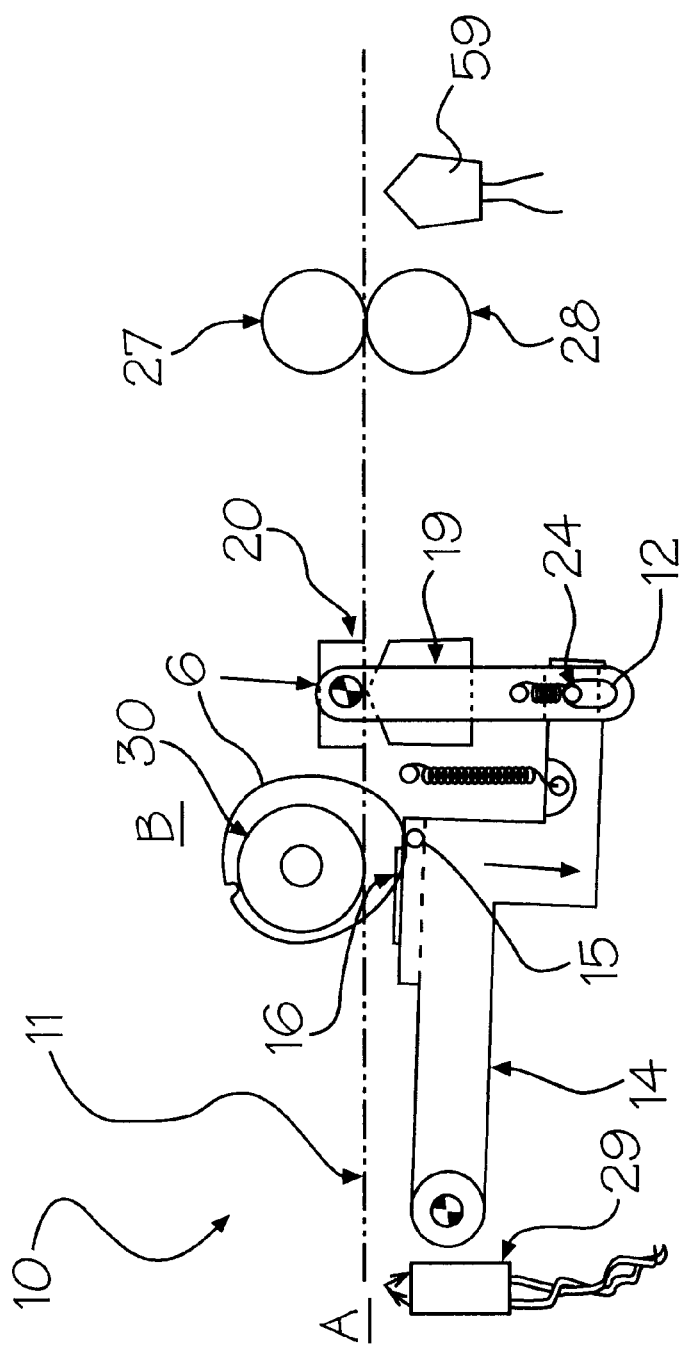
FIG. 3 shows a schematic view of a check processing apparatus in a third check handling position corresponding to reading of the imprinted MICR characters on the check.

Referring to FIG. 3, the third position of apparatus 10 is shown. In this position, the MICR indicia printed upon the check are read. Feed rollers 27 and 28 are clamped together and grip the check after the MICR indicia has been printed. Power input shaft 1 rotates clockwise and drives the cam 6 half-way to its high point. In this position, there is clearance between the print head 16 and platen 30, and also between pressure pad 20 and MICR read head 19. The check is then driven back out of the apparatus 10, where it is detected by the reflective optical sensor 29, which stops the feed rollers 27 and 28. Shaft 1 continues rotating clockwise and drives cam 6 to its high point against pin 15, and stops. This allows pressure pad 20 to contact and press the check against the MICR read head 19. Feed rollers 27 and 28 then drive the check past the MICR read head 19, which verifies the printed MICR characters. Cam 6 is then rotated clockwise back to position 1, so that there is again clearance between print head 16 and platen 30, and pressure pad 20 and MICR read head 19. Feed rollers 27 and 28 then drive the check back out of the check processing apparatus 10, and present it to the operator. Feed rollers 27 and 28 open to allow removal of the check. The mechanism is now back at the home position (FIG. 1), and is now ready for another point-of-sale transaction.

It can be observed that the optical sensor 29 plays an important role in MICR character imprinting and reading. The amount field must be precisely and accurately ascertained for both operations, and sensing of the leading edge of the check precisely locates the amount field upon the check being processed. It then becomes a simple matter to advance the check by a stepper drive motor a fixed number of step increments, in order to start the printing and read sequences.

Now referring to FIGS. 4a and 4b, respective frontal cut-away and side views are shown of the bi-directional clutch 50, which drives cam 6 and platen 30. A drive dog 2 is fixedly coupled to the input shaft 1 via set screws 3. A drive pawl 4 is pivotally attached to the drive dog 2 via pivot pin 5. The pawl tooth 4a ramps away from the angular detent surface of notch 8a disposed in clutch surface 8, when the shaft 1 is rotated in the clockwise direction (arrow 34, FIG. 2). The tooth 4a then engages in notch 6a disposed on cam 6. The cam 6 is normally held in position by leaf spring 7, which engages detent notch 6b. As the drive dog 2 continues to rotate in the clockwise direction (arrow 34), the detent force of leaf spring 7 is overcome, and the cam 6 rotates to the MICR encode position shown in FIG. 2.

The pawl tooth 4b ramps away from the angular detent surface 6a in cam 6, when the shaft 1 rotates in the counterclockwise direction (arrow 36, FIG. 2). The leaf spring 9 normally disposed in the detent 8b of the clutch surface 8, and which holds same in position, is overcome by the counter-rotative force, allowing the check processing apparatus 10 to achieve the MICR read position, shown in FIG. 3. The clutch 50 is driven by a stepper motor 40, the shaft 1 of which supports platen 30 via bearings 41, shown in FIG. 4b. An arm 42 attached to shaft 1 passes through an optical sensor 43, as shown. The optical sensor 43 detects a home position of stepper motor 40, and hence the position of the cam 6.

Figure 5:
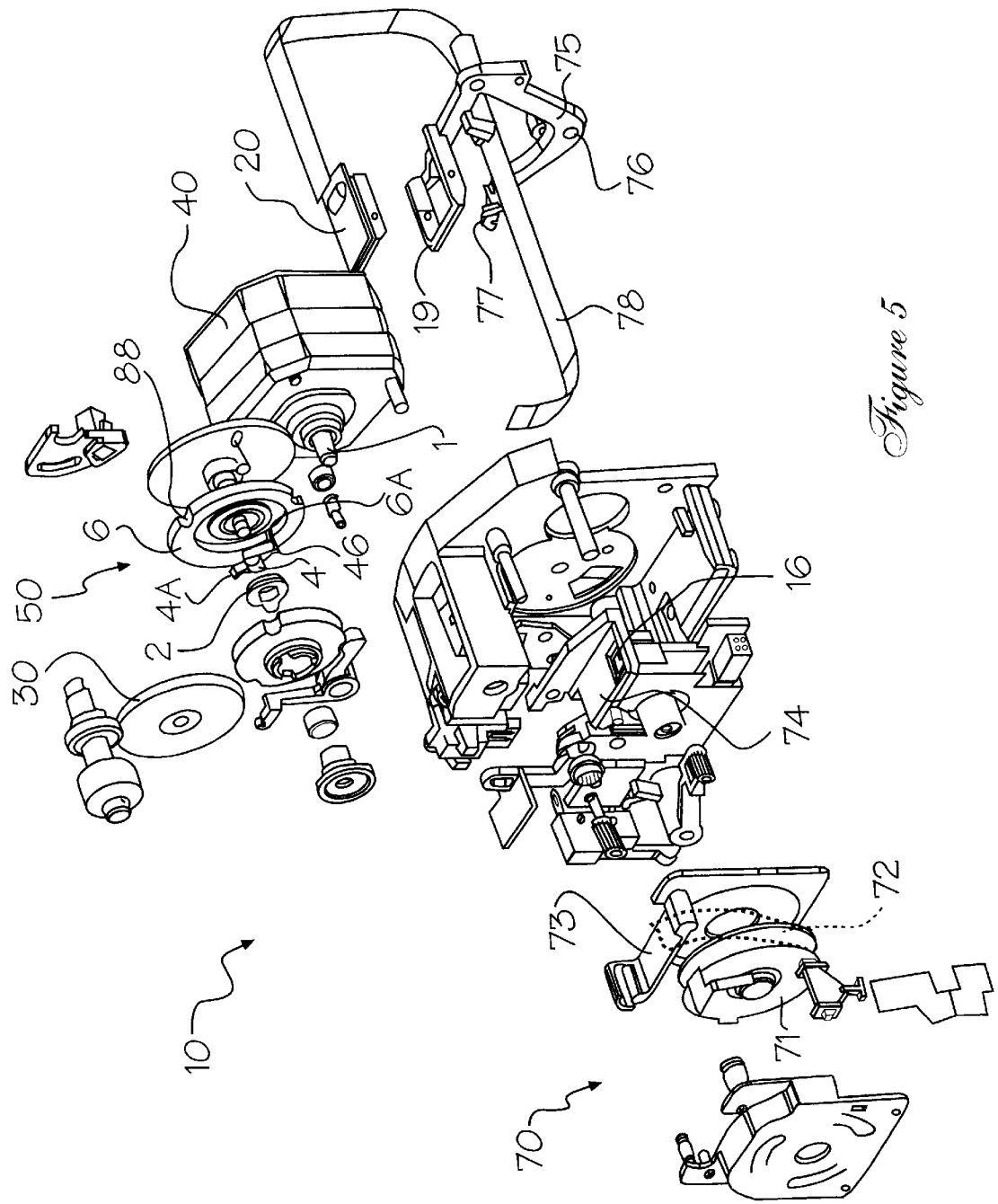
FIG. 5 depicts a perspective, exploded view of the check processing apparatus shown schematically in FIGS. 1 through 3, and including the bi-directional clutch illustrated in cutaway and side views in FIGS. 4a and 4b.

Referring to FIG. 5, an exploded, perspective view of the actual check processing apparatus 10 is shown. A cassette 70 contains a roll 71 of thermal ribbon 72. The ribbon 72 is moved across the stage 73 of cassette 70, as the roll 71 is rotated by shaft 1. The ribbon 72 is threaded through the printing stage 74. The platen 30, which is influenced by the bi-directional clutch 50, acts to control the encoding of MICR indicia by forcing the ribbon 32 into contact with the printing head 16.

The read head 19 comes into contact with the pad 20 via a pivot arm 75 that pivots about pivot 76. The pivot arm 75 has a finger 77 that rests in detent 8b. Movement of the bi-directional clutch 50 to the MICR read position forces the arm 75 to pivot, causing the read head 19 to come into contact with pad 20. The pivot arm 75 is biased against contact with pad 20 by leaf spring 78.

Figure 6:
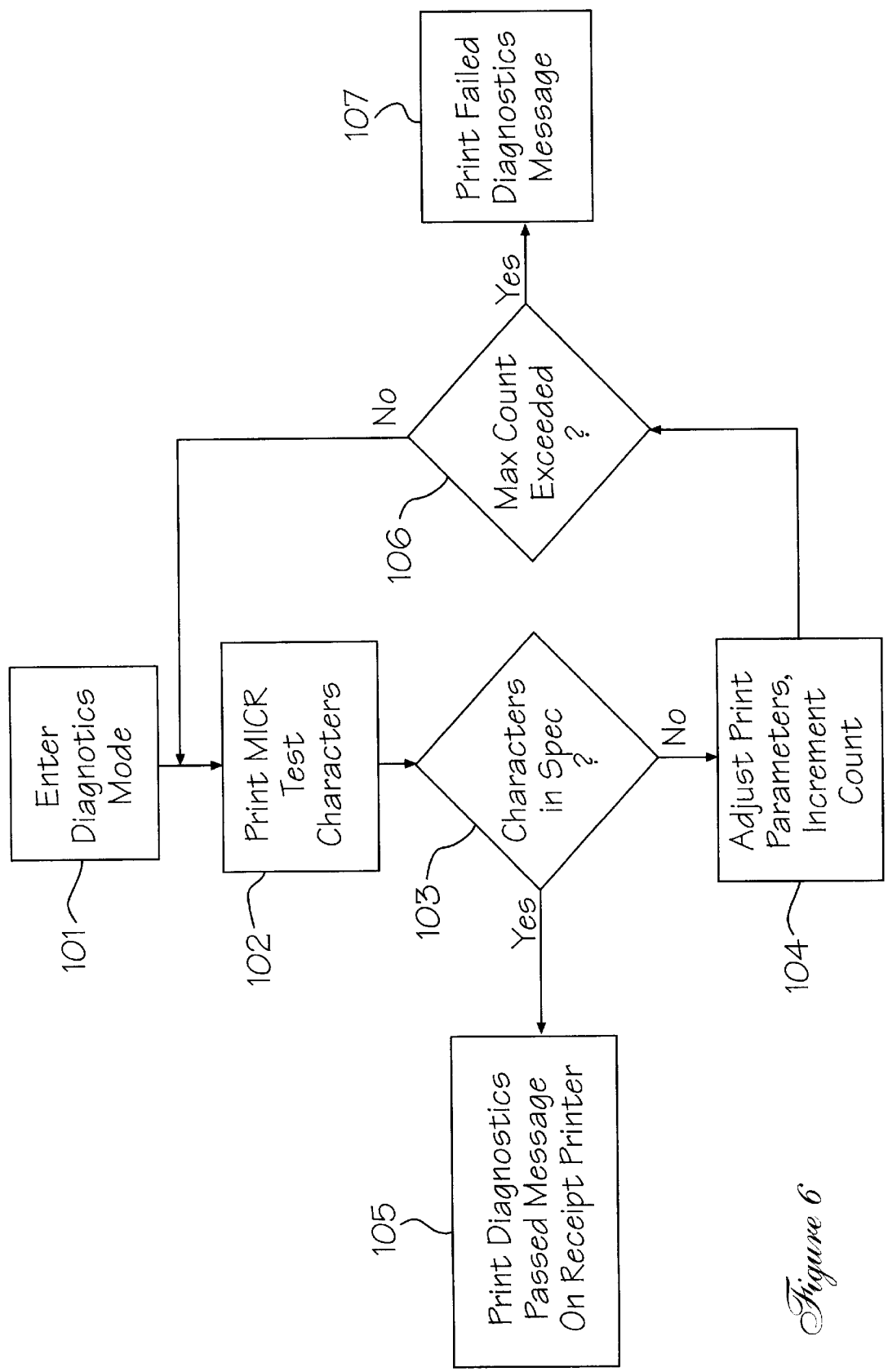
FIG. 6 shows a flow chart diagram illustrating the diagnostic method used to tune the print system of the check processing machine shown in FIG. 5.

Referring to FIG. 6, a flow chart 100 is shown featuring the method used to diagnostically tune the print parameters of the MICR print head 19. The diagnostic mode is selected at a control panel (not shown) of the check processing machine 10, step 101. The diagnostic mode selection initiates the printing of a MICR document, (step 102), containing standard CMC7 or E13B characters and symbols, as well as unique indicia that includes vertical bars, known in the art as "zebras." Thereafter, the diagnostic program commands the check processing machine 10 to read these characters, symbols, and indicia just encoded on the document, and decide whether the MICR indicia are within specifications, step 103. If the characters are not within specification, step 103, then the print parameters are adjusted in accordance with predetermined algorithms, step 104. A counter is incremented each time the print parameters are adjusted, step 104. If a predetermined, maximum count is exceeded, step 106, a diagnostics failure is printed on the receipt printer, step 107. If the maximum count has not been reached, step 106, then the process is repeated upon re-execution of step 102. The failure message can be displayed on a screen of the control panel (not shown). The closed loop adjusts the print parameters until a document is printed within specification or the maximum count is reached, step 103. A successful print message is then displayed upon the control panel screen, step 105.

The print parameters controlled by the inventive diagnostic system generally include control of energy to the thermal MICR print head and/or control of timing signals. It will be obvious to those skilled in the art that the inventive methodology may be used to vary any other print parameter without departing from the true scope and spirit of the invention.

A self-adjusting print system as described above has the advantage of lowering service calls and personnel, and provides for a more reliable check encoding machine.

The self-adjusting print system automatically keeps a record of each print transaction, and stores same in a non-volatile memory (not shown). The non-volatile memory may be located within the transaction printer, in a controller to which the printer is attached, or in a central computer. The record creates a data base by which service personnel can monitor the "state of health" of the check processing machine. The data base includes information about the measure of the degree to which printed characters are within specifications.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A transaction printer for encoding and reading MICR indicia upon a check at a point-of-sale, said transaction printer comprising:

means defining a check processing feed path;

means disposed along said check processing feed path for feeding said check along said check processing feed path;

a MICR encoding zone disposed along said feed path, said MICR encoding zone comprising a non-impact print head for printing MICR indicia upon a check;

at least one MICR read head disposed along said feed path for reading imprinted MICR indicia;

control means operatively connected to said print head and said at least one read head for determining whether said printed MICR indicia is within a predetermined MICR printing specification; and storage means operatively connected to said head for maintaining data representative of the deviation of at least one print transaction from said predetermined MICR printing specification.

2. A transaction printer for encoding and reading MICR indicia upon said check at a point-of-sale, said transaction printer comprising:

means defining a check processing feed path;

means disposed along said check processing feed path for feeding said check along said feed path;

a check encoding zone and at least one reading zone disposed along said feed path for imprinting and reading MICR indicia upon said check, in order to verify said imprinted MICR indicia;

a predetermined MICR printing specification;

storage means operatively associated with said encoding zone and said at least one reading zone for comparing said print transactions to said predetermined MICR specification and establishing and maintaining a data base of print transactions; and adjustment means operatively connected to said storage means and said check encoding zone for modifying said imprinting of said MICR characters responsive to said data base.

3. A method of processing a check at a point-of-sale, such that said check will be encoded with MICR indicia, read, and verified, the method comprising the steps of:

a) presenting a check at a point-of-sale to a transaction printer having MICR encoding and reading capability; and b) driving said check along a MICR encoding feed path to provide a sequential check processing operation, including the further steps of:

i) imprinting said check with MICR indicia;

ii) reading and verifying said MICR indicia imprinted upon said check; and iii) storing data with respect to each printing transaction.

4. A method of storing printing parameters in a check processing machine, comprising the steps of:

a) printing each transaction, comprising MICR indicia;

b) reading said printed transaction; and c) storing printing parameters to provide a data base of said MICR indicia.

5. The method in accordance with claim 4, wherein the storing step (c) further comprises the step of:

d) determining how close each stored printing parameter is to a predetermined specification.

6. The transaction printer for encoding and reading MICR indicia upon a check at a point-of-sale as recited in claim 1, wherein said non-impact print head comprises a thermal print head.

7. The method in accordance with claim 5, further comprising the step of:

e) modifying said printing step (a) in response to said determining step (d) to substantially match said stored printing parameters to said predetermined specification.

* * * * *